(12) United States Patent
Davuluri et al.

(10) Patent No.: US 11,488,116 B2
(45) Date of Patent: Nov. 1, 2022

(54) DYNAMICALLY GENERATED NEWS FEED

(71) Applicant: HUDDL INC., Santa Clara, CA (US)

(72) Inventors: Nava Davuluri, Sunnyvale, CA (US); Srivathsan Narasimhan, Hyderabad (IN); Harish Rajamani, Hyderabad (IN); Krishna Yarlagadda, Sunnyvale, CA (US); Aditya Sudhakar, Sunnyvale, CA (US); Prathyusha Danda, Hyderabad (IN); Ramanathan Parameshwaran, Hyderabad (IN)

(73) Assignee: HUDDL INC., Santa Clara, CA (US)

( * ) Notice: Subject to any disclaimer, the term of this patent is extended or adjusted under 35 U.S.C. 154(b) by 0 days.

(21) Appl. No.: 17/308,623

(22) Filed: May 5, 2021

(65) Prior Publication Data
US 2021/0367800 A1    Nov. 25, 2021

Related U.S. Application Data

(60) Provisional application No. 63/028,123, filed on May 21, 2020.

(51) Int. Cl.
*H04L 12/18* (2006.01)
*H04L 12/58* (2006.01)
(Continued)

(52) U.S. Cl.
CPC ....... *G06Q 10/1097* (2013.01); *G06F 3/0484* (2013.01); *G06F 16/345* (2019.01);
(Continued)

(58) Field of Classification Search
CPC ............ H04L 12/1818; H04L 12/1831; H04L 65/1096; H04L 65/403; H04L 51/32;
(Continued)

(56) References Cited

U.S. PATENT DOCUMENTS

| 7,634,540 B2 | 12/2009 | Ivashin et al. |
| 9,113,032 B1 | 8/2015 | Mey et al. |

(Continued)

FOREIGN PATENT DOCUMENTS

WO    WO-2019205271 A1 * 10/2019

OTHER PUBLICATIONS

Non-Final Office Action in U.S. Appl. No. 17/308,329 dated Nov. 15, 2021.
(Continued)

*Primary Examiner* — Ruolei Zong
(74) *Attorney, Agent, or Firm* — Chip Law Group (57) ABSTRACT

Provided is a method and a system for dynamically generating a news feed and displaying the news feed to a plurality of participants in a meeting. The method is implemented by a central server including one or more processors. The method includes identifying in real time a trigger event initiated by at least one participant of the meeting. The trigger event is indicative of at least a reference, by the participant, to metadata associated with the meeting. The method includes capturing during the meeting one or more meeting snippets based on identification of the trigger event. The method includes receiving feedback on each of the one or more meeting snippets from the plurality of participants during the meeting. The method includes dynamically generating a news feed based on the captured meeting snippets and the feedback. Further, the method includes displaying the dynamically generated news feed to the plurality of participants.

25 Claims, 5 Drawing Sheets

(51) Int. Cl.

| | |
|---|---|
| *G06F 16/954* | (2019.01) |
| *G06Q 10/10* | (2012.01) |
| *G06N 20/00* | (2019.01) |
| *G10L 15/18* | (2013.01) |
| *G10L 15/22* | (2006.01) |
| *G10L 25/57* | (2013.01) |
| *H04N 7/15* | (2006.01) |
| *H04L 65/401* | (2022.01) |
| *H04L 65/403* | (2022.01) |
| *G06F 16/34* | (2019.01) |
| *G10L 15/26* | (2006.01) |
| *G06F 3/0484* | (2022.01) |
| *H04L 65/1096* | (2022.01) |
| *H04L 51/52* | (2022.01) |
| *H04L 67/50* | (2022.01) |
| *H04N 21/8549* | (2011.01) |

(52) U.S. Cl.
CPC .......... *G06F 16/954* (2019.01); *G06N 20/00* (2019.01); *G06Q 10/1095* (2013.01); *G10L 15/1815* (2013.01); *G10L 15/22* (2013.01); *G10L 15/26* (2013.01); *G10L 25/57* (2013.01); *H04L 12/1818* (2013.01); *H04L 12/1831* (2013.01); *H04L 51/52* (2022.05); *H04L 65/1096* (2013.01); *H04L 65/403* (2013.01); *H04L 65/4015* (2013.01); *H04L 67/535* (2022.05); *H04N 7/15* (2013.01); *H04N 21/8549* (2013.01)

(58) Field of Classification Search
CPC .. H04L 67/22; G06Q 10/1097; G06Q 10/109; G06F 16/954; G06F 16/345
USPC ......................................................... 709/204
See application file for complete search history.

(56) References Cited

U.S. PATENT DOCUMENTS

| | | | |
|---|---|---|---|
| 9,699,410 | B1 | 7/2017 | Nagabushanam |
| 10,255,946 | B1 | 4/2019 | Andrizzi et al. |
| 10,484,189 | B2 | 11/2019 | Albrecht |
| 10,757,148 | B2 | 8/2020 | Nelson et al. |
| 10,999,346 | B1 | 5/2021 | Yang |
| 11,049,077 | B1 | 6/2021 | Vukich |
| 11,080,356 | B1* | 8/2021 | Kumar ............... G06F 16/25 |
| 11,095,468 | B1 | 8/2021 | Pandey et al. |
| 11,184,560 | B1 | 11/2021 | Mese et al. |
| 2004/0263610 | A1 | 12/2004 | Whynot et al. |
| 2009/0210933 | A1 | 8/2009 | Shear et al. |
| 2009/0222741 | A1 | 9/2009 | Shaw et al. |
| 2011/0072362 | A1 | 3/2011 | Denner et al. |
| 2011/0249073 | A1 | 10/2011 | Cranfill et al. |
| 2012/0066596 | A1 | 3/2012 | Feng et al. |
| 2012/0144320 | A1 | 6/2012 | Mishra et al. |
| 2013/0027502 | A1 | 1/2013 | Skramstad |
| 2013/0191299 | A1 | 7/2013 | Hermsdorff et al. |
| 2013/0282820 | A1 | 10/2013 | Jabri et al. |
| 2013/0325972 | A1* | 12/2013 | Boston ............... G06K 9/00751 709/206 |
| 2014/0006955 | A1 | 1/2014 | Greenzeiger et al. |
| 2014/0098180 | A1 | 4/2014 | Periyannan et al. |
| 2015/0081841 | A1 | 3/2015 | Pino et al. |
| 2015/0142800 | A1 | 5/2015 | Thapliyal |
| 2016/0117624 | A1 | 4/2016 | Flores et al. |
| 2016/0350720 | A1 | 12/2016 | Moorjani et al. |
| 2018/0046957 | A1 | 2/2018 | Yaari et al. |
| 2018/0077092 | A1 | 3/2018 | Jalil |
| 2018/0101760 | A1 | 4/2018 | Nelson et al. |
| 2018/0101824 | A1 | 4/2018 | Nelson et al. |
| 2018/0131904 | A1 | 5/2018 | Segal |
| 2018/0241968 | A1 | 8/2018 | Chen |
| 2018/0270452 | A1 | 9/2018 | Moon et al. |
| 2018/0299864 | A1 | 10/2018 | Byers et al. |
| 2018/0331842 | A1* | 11/2018 | Faulkner ............... H04N 7/15 |
| 2019/0007649 | A1 | 1/2019 | Rensburg et al. |
| 2019/0052590 | A1 | 2/2019 | Katis et al. |
| 2019/0172017 | A1 | 6/2019 | Budin et al. |
| 2019/0273627 | A1* | 9/2019 | Whalin ............... G06Q 30/02 |
| 2019/0312917 | A1 | 10/2019 | Choi et al. |
| 2019/0332994 | A1 | 10/2019 | Adamson et al. |
| 2019/0386839 | A1 | 12/2019 | Kosugi et al. |
| 2020/0092341 | A1 | 3/2020 | Wang et al. |
| 2020/0106735 | A1 | 4/2020 | Guerrieri et al. |
| 2020/0167371 | A1 | 5/2020 | Klym et al. |
| 2020/0341625 | A1 | 10/2020 | Roedel et al. |
| 2020/0374146 | A1 | 11/2020 | Chhabra et al. |
| 2020/0403817 | A1* | 12/2020 | Daredia ............... G10L 15/083 |
| 2021/0201935 | A1 | 7/2021 | Seethaler et al. |
| 2021/0226808 | A1 | 7/2021 | Zarakas et al. |
| 2021/0233036 | A1 | 7/2021 | Zarakas et al. |
| 2021/0243696 | A1 | 8/2021 | Sanaullah et al. |
| 2021/0264377 | A1 | 8/2021 | Ebner et al. |
| 2021/0306173 | A1* | 9/2021 | Krikunov ........... G06K 9/00315 |
| 2021/0344612 | A1 | 11/2021 | Files et al. |
| 2021/0352120 | A1 | 11/2021 | Masi et al. |

OTHER PUBLICATIONS

Non-Final Office Action in U.S. Appl. No. 17/308,887 dated Dec. 22, 2021.
Non-Final Office Action in U.S. Appl. No. 17/308,916 dated Dec. 17, 2021.
Non-Final Office Action in U.S. Appl. No. 17/308,264 dated Oct. 28, 2021.
Final Office Action for U.S. Appl. No. 17/308,916 dated May 5, 2022.
Final Office Action in U.S. Appl. No. 17/308,887 dated May 2, 2022.
Non-Final Office Action in U.S. Appl. No. 17/308,640 dated Mar. 15, 2022.
Notice of Allowance in U.S. Appl. No. 17/308,329 dated Mar. 30, 2022.
Advisory Action in U.S. Appl. No. 17/308,887 dated Jul. 15, 2022.
Advisory Action in U.S. Appl. No. 17/308,916 dated Jul. 27, 2022.
Corrected Notice of Allowance in U.S. Appl. No. 17/308,329 dated Jul. 18, 2022.
Final Office Action in U.S. Appl. No. 17/308,640 dated Jul. 13, 2022.
Non-Final Office Action for U.S. Appl. No. 17/308,586 dated Sep. 19, 2022.

* cited by examiner

FIG. 5 Example Computer System

DYNAMICALLY GENERATED NEWS FEED

CROSS-REFERENCE TO RELATED APPLICATIONS/INCORPORATION BY REFERENCE

This application makes reference to, claims priority to, and claims benefit from U.S. Provisional Application Ser. No. 63/028,123, which was filed on May 21, 2020.

The above referenced application is hereby incorporated herein by reference in its entirety.

TECHNICAL FIELD

The presently disclosed exemplary embodiments are related, in general, to media presentation to a plurality of participants in an online meeting. More particularly, the presently disclosed exemplary embodiments are related to a method and a system for dynamically generating a news feed and displaying the news feed to the plurality of participants in the online meeting.

BACKGROUND

Conventionally, users of networking websites may connect with each other and share information. Recently, social networking websites have enabled users to share content with each other and the social networking websites may create a customized news feed for users based on the interests, geographical location, browsing history, and the like. A few state-of-the-art mechanisms may allow a user to display information about other users. Such mechanisms may allow the user to select content for immediate viewing. Typically, however, such content may be disparate and disorganized. Alternatively stated, the user must spend time researching a topic by searching for, identifying, and reading individual content that may not be presented in a coherent, consolidated manner. Additionally, often the user may remain unaware of the existence of some content that was not captured in the user's research.

Organizations may typically have an internal news feed portal where the organizations may have access to large amounts of information describing actions performed by the users on content shared in the news feed. These actions include, photo uploads, status updates, transactions, wall posts, posting of comments, recommendations, sharing of posts, likes indicated on other users' photos, videos, and the like. Such information may be of interest to the organization. For example, the organization may want to understand sentiment of the employees after a recent organizational restructure post that was posted on the news feed based on interactions received from employees.

In organizations, a significant amount of rich content is typically shared and discussed during online meetings. In many instances, such content may not be shared with a larger audience within the organization and thus employees within the organization may be unaware of high-level decisions of the organization, trending topics being discussed in the online meetings, outcomes of online meetings, and the like. Existing tools do not have the capability to monitor and share the online meetings within the organization to identify content that may be relevant to the larger audience within the organization.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

A method and a system for dynamically generating a news feed and displaying the news feed to a plurality of participants in an online meeting is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

The illustrated embodiments provide a method and a system for dynamically generating a news feed and displaying the news feed to a plurality of participants in a meeting. The method may be implemented by a central server including one or more processors. The method may include identifying in real time a trigger event initiated by at least one participant of the meeting. In an exemplary embodiment, the trigger event may be indicative of at least a reference, by the at least one participant, to metadata associated with the meeting. The method may include capturing during the meeting one or more meeting snippets based on identification of the trigger event. The method may include receiving feedback on each of the one or more meeting snippets from the plurality of participants during the meeting. The method may include dynamically generating the news feed based on the captured one or more meeting snippets and the feedback. Further, the method may include displaying the dynamically generated news feed to the plurality of participants.

Figure 1:
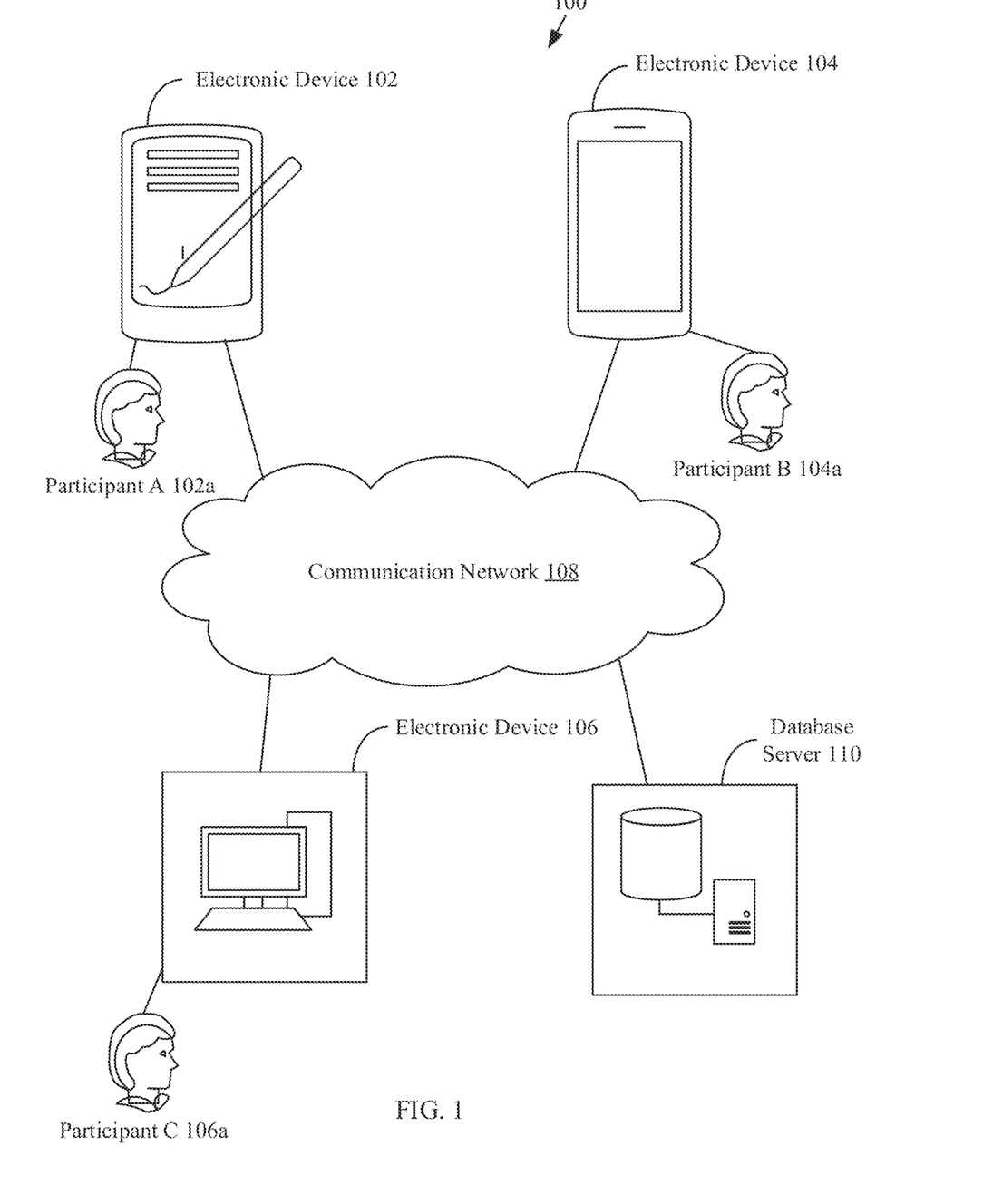
FIG. 1 is a block diagram that illustrates a system environment for dynamically generating a news feed, in accordance with at least one exemplary embodiment of the disclosure.

FIG. 1 is a block diagram that illustrates a system environment 100 for dynamically generating a news feed, in accordance with at least one exemplary embodiment of the disclosure. Referring to FIG. 1, the system environment 100 may include a plurality of electronic devices, such as 102, 104 and 106, which are associated with a plurality of participants, such as Participant A 102*a*, Participant B 104*a*, and Participant C 106*a*, a communication network 108, a database server 110, and a central server 112. Each of the plurality of electronic devices 102, 104, and 106 that are associated with the plurality of participants, such as Participant A 102*a*, Participant B 104*a*, and Participant C 106*a*, may be communicatively coupled with the database server 110, and the central server 112, via the communication network 108.

The plurality of electronic devices, such as electronic device 102, 104 and 106 may refer to a computing device used by a participant who has joined an online meeting to collaboratively work with a remaining plurality of participants. The plurality of electronic devices, such as electronic device 102, 104 and 106 may comprise one or more processors and one or more memories. The one or more memories may include computer readable code that may be executable by the one or more processors to perform predetermined operations. In an exemplary embodiment, the plurality of electronic devices, such as electronic device 102, 104 and 106 may present a user-interface to the participant for performing one or more interactions on the electronic device. Examples of the plurality of electronic devices, such as electronic device 102, 104 and 106 may include, but are not limited to, a personal computer, a laptop, a personal digital assistant (PDA), a mobile device, a tablet, or any other computing device.

The plurality of participants, such as Participant A 102*a*, Participant B 104*a*, and Participant C 106*a* may be utilizing the electronic device 102, the electronic device 104 and the electronic device 106, respectively as shown in FIG. 1. The plurality of participants, such as Participant A 102*a*, Participant B 104*a*, and Participant C 106*a* may interact with the plurality of electronic devices, such as electronic device 102, 104 and 106 by performing one or more interactions on the user-interface (shown in FIG. 3) presented to each of the respective participants of the associated electronic device.

In an exemplary embodiment, the communication network 108 may include a communication medium through which each of the plurality of electronic devices, such as 102, 104 and 106, the database server 110, and the central server 112 may communicate with each other. Such a communication may be performed, in accordance with various wired and wireless communication protocols. Examples of such wired and wireless communication protocols include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, 2G, 3G, 4G, 5G, 6G cellular communication protocols, and/or Bluetooth (BT) communication protocols. The communication network 108 may include, but is not limited to, the Internet, a cloud network, a Wireless Fidelity (Wi-Fi) network, a Wireless Local Area Network (WLAN), a Local Area Network (LAN), a telephone line (POTS), and/or a Metropolitan Area Network (MAN).

In an exemplary embodiment, the plurality of electronic devices, such as electronic device 102, 104 and 106 may include a database server 110. In an exemplary embodiment, the database server 110 may refer to a computing device that may be configured to store files associated with one or more applications installed on the electronic device. Further, the database server 110 may be configured to store information, such as, but not limited to, captured one or more meeting snippets, ranking data associated with each of the one or more meeting snippets, one or more interactions associated with each of the one or more meeting snippets, one or more categories associated with the news feed, and the like.

In an exemplary embodiment, the plurality of electronic devices, such as electronic device 102, 104 and 106 may communicate with the database server 110 using one or more protocols such as, but not limited to, Open Database Connectivity (ODBC) protocol and Java Database Connectivity (JDBC) protocol. In an exemplary embodiment, the database server 110 may include a special purpose operating system specifically configured to perform one or more database operations on the one or more meeting snippets. Examples of database operations may include, but are not limited to, Select, Insert, Update, and Delete. In an exemplary embodiment, the database server 110 may include hardware that may be configured to perform one or more predetermined operations. In an exemplary embodiment, the database server 110 may be realized through various technologies such as, but not limited to, Microsoft® SQL Server, Oracle®, IBM DB2®, Microsoft Access®, PostgreSQL®, MySQL® and SQLite®, and the like.

A person having ordinary skill in the art will appreciate that the scope of the disclosure is not limited to realizing the plurality of electronic devices, such as electronic device 102, 104 and 106 and the database server 110 as separate entities. In an exemplary embodiment, the database server 110 may be realized as an application program installed on and/or running on the electronic device without departing from the scope of the disclosure.

In an exemplary embodiment, the central server 112 may refer to a computing device or a software framework hosting an application or a software service. In an embodiment, the central server 112 may be implemented to execute procedures such as, but not limited to, programs, routines, or scripts stored in one or more memories for supporting the hosted application or the software service. In an embodiment, the hosted application or the software service may be configured to perform one or more predetermined operations. The central server 112 may be realized through various types of application servers such as, but are not limited to, a Java application server, a .NET framework application server, a Base4 application server, a PHP framework application server, or any other application server framework.

The "meeting" mentioned in the disclosure herein refers to an online meeting conducted via one or more video conferencing tools. The "meeting" may involve the plurality of participants, such as Participant A 102*a*, Participant B 104*a*, and Participant C 106*a* interacting with each other and/or discussing one or more topics. In some examples, the meeting may be organized face to face or on a virtual platform over the communication network 108. Meeting on the virtual platform may involve the plurality of participants, such as Participant A 102*a*, Participant B 104*a*, and Participant C 106*a*, joining a meeting session (created by the central server 112 in the communication network 108) using the respective plurality of electronic devices, such as 102, 104 and 106. Further, in the meeting on the virtual platform, the respective plurality of electronic devices, such as 102, 104 and 106 may generate meeting data based on inputs provided by the plurality of participants, such as Participant A 102*a*, Participant B 104*a*, and Participant C 106*a*, during the meeting. In an exemplary embodiment, the meeting data may correspond to content that may be shared amongst the plurality of participants, such as Participant A 102*a*, Participant B 104*a*, and Participant C 106*a*, during the meeting. Some examples of the meeting data may include, but not limited to, an audio content generated by the plurality of participants as the plurality of participants speak during the meeting, video content such as a video feed of the plurality of participants, meeting notes that may be input by the plurality of participants during the meeting, presentation content, screen sharing content, file sharing content and/or any other content shared during the meeting.

In an exemplary embodiment, the meeting may be conducted on a video conferencing tool. Video conferencing tools may enable online communication for audio meetings, video meetings, and seminars between the plurality of participants, such as Participant A 102a, Participant B 104a, and Participant C 106a. The video conferencing tools may have one or more built-in features such as chat, screen sharing, recording, and the like. The video conferencing tools used for hosting the meeting may help to enhance collaboration within employees in an organization. The employees may host or attend virtual meetings with fellow employees, company partners, and/or customers.

In operation, conducting a meeting over a communication network 108 may involve a central server 112 creating a meeting session. Prior to creation of the meeting session, the central server 112 may receive a request from an electronic device, such as 102 associated with a participant A such as an organizer of the meeting, to create the meeting session. Along with the request, the organizer of the meeting (one of the participants, such as Participant A) may define meeting metadata associated with the meeting. Such meeting metadata associated with the meeting may include at least an agenda of the meeting, one or more topics to be discussed during the meeting, a time duration of the meeting, a schedule of the meeting, meeting notes carried forwarded from previous meetings, and/or the like. After receiving the meeting metadata, the central server 112 may be configured to create the meeting session. Additionally, the central server 112 may share the meeting metadata with the plurality of participants, such as Participant A 102a, Participant B 104a, and Participant C 106a.

The plurality of participants, such as Participant A 102a, Participant B 104a, and Participant C 106a, may join the meeting via the respective plurality of electronic devices, such as 102, 104 and 106. Further, during the meeting, the plurality of participants, such as Participant A 102a, Participant B 104a, and Participant C 106a, may speak or share their respective video feeds. Additionally, or alternatively, the plurality of participants, such as Participant A 102a, Participant B 104a, and Participant C 106a, may share other content amongst each other in order to facilitate the discussions in the meeting. The other content may include, but is not limited to, presentation content, screen sharing content, file sharing content, and/or the like. In some examples, the content generated and/or shared amongst the plurality of participants, such as Participant A 102a, Participant B 104a, and Participant C 106a, may be referred to as meeting data. In an exemplary embodiment, each of the plurality of electronic devices, such as 102, 104 and 106 may transmit the meeting data to the central server 112.

During the meeting, the central server 112 may be configured to receive the meeting data and an agenda of the meeting from the plurality of electronic devices, such as 102, 104 and 106. Additionally, the central server 112 may monitor the meeting data (being generated by the plurality of electronic devices). Monitoring the meeting data may include transforming the meeting data in text format. For example, the audio content, received from the plurality of electronic devices, such as 102, 104 and 106, may be converted to text using one or more speech to text techniques (STT). Similarly, the video content and/or screen sharing content (received from the plurality of electronic devices, such as 102, 104 and 106) may be converted to text using one or more optical character recognition techniques. In some examples, the text obtained from the meeting data may be referred to as a transcript of the meeting.

The central server 112 may be configured to compare the transcript (text obtained from the meeting data) with the meeting metadata. The central server 112 may be configured to identify a trigger event in real-time during the meeting that may be initiated by at least one participant of the meeting based on the comparison. In an exemplary embodiment, the trigger event may be indicative of at least a reference, by the participant, to the metadata associated with the meeting. In an exemplary embodiment, the trigger event may correspond to a time instant, during the meeting, at which the meeting metadata was discussed by a participant. Additionally, or alternatively, the central server 112 may receive an input from an electronic device, such as 102 associated with the Participant A 102a of the plurality of participants. The central server 112 may identify the received input as the trigger event.

Upon identification of the trigger event, the central server 112 may be configured to record the meeting for a determined duration to capture a meeting snippet. In an exemplary embodiment, the meeting snippet may correspond to a recording of a portion of the meeting. The meeting snippet may be captured for a determined duration. In some examples, the meeting snippet may include the meeting data generated during the determined duration. During the meeting, the central server 112 may capture one or more meeting snippets.

After capturing the one or more meeting snippets, the central server 112 may be configured to receive feedback on each of the one or more meeting snippets from the plurality of participants, such as Participant A 102a, Participant B 104a, and Participant C 106a during the meeting. The feedback may be captured based on one or more interactions received from the plurality of participants, such as Participant A 102a, Participant B 104a, and Participant C 106a. The one or more interactions may comprise at least one of: a number of likes, a number of comments, and a number of times the meeting snippets are shared on one or more social network platforms or enterprise platforms. In some examples, the number of likes associated with a meeting snippet A may be 54 and the number of comments on the meeting snippet A may be 134 and the number of likes associated with a meeting snippet B may be 10 and the number of comments on the meeting snippet B may be 23. Further, the number of likes associated with a meeting snippet C may be 523 and the number of comments on the meeting snippet C may be 1024.

Upon receiving the feedback, the central server 112 may be configured to perform ranking of each of the one or more meeting snippets based on the feedback. For example, continuing the same aforementioned example, the meeting snippet C has the highest number of likes and the highest number of comments, followed by the meeting snippet A and then followed by the meeting snippet B. Thus, the meeting snippet C and the meeting snippet A have received the most feedback that is captured using the one or more interactions from plurality of participants, such as Participant A 102a, Participant B 104a, and Participant C 106a and thus, should be included while generating the dynamic newsfeed. Thus, the central server 112 may be configured to dynamically generate the news feed based on the captured one or more meeting snippets and the feedback as illustrated above. The news feed may include one or more meeting snippets, such as the meeting snippet A and meeting snippet C that may be presented to the plurality of participants, such as Participant A 102a, Participant B 104a, and Participant C 106a. The news feed may also be referred to herein as news feed stories, stories, the news feed, or feed stories.

Further, such dynamically generated news feed information may be transmitted to each of the plurality of electronic devices, such as 102, 104 and 106. In an exemplary embodiment, each of the plurality of electronic devices, such as 102, 104 and 106 may be configured to display the dynamically generated news feed to the plurality of participants, such as Participant A 102a, Participant B 104a, and Participant C 106a. The dynamically generated news feed may also be provided to a plurality of users within a private network within an organization and also to the plurality of participants, such as Participant A 102a, Participant B 104a, and Participant C 106a attending the online meeting.

Further, the central server 112 may aggregate the plurality of meeting snippets to generate a meeting summary. The central server 112 may share the meeting summary with the plurality of participants of the meeting, such as Participant A 102a, Participant B 104a, and Participant C 106a. Accordingly, the plurality of participants, such as Participant A 102a, Participant B 104a, and Participant C 106a may refer to the meeting summary and may accordingly plan one or more action items discussed during the meeting.

Figure 2:
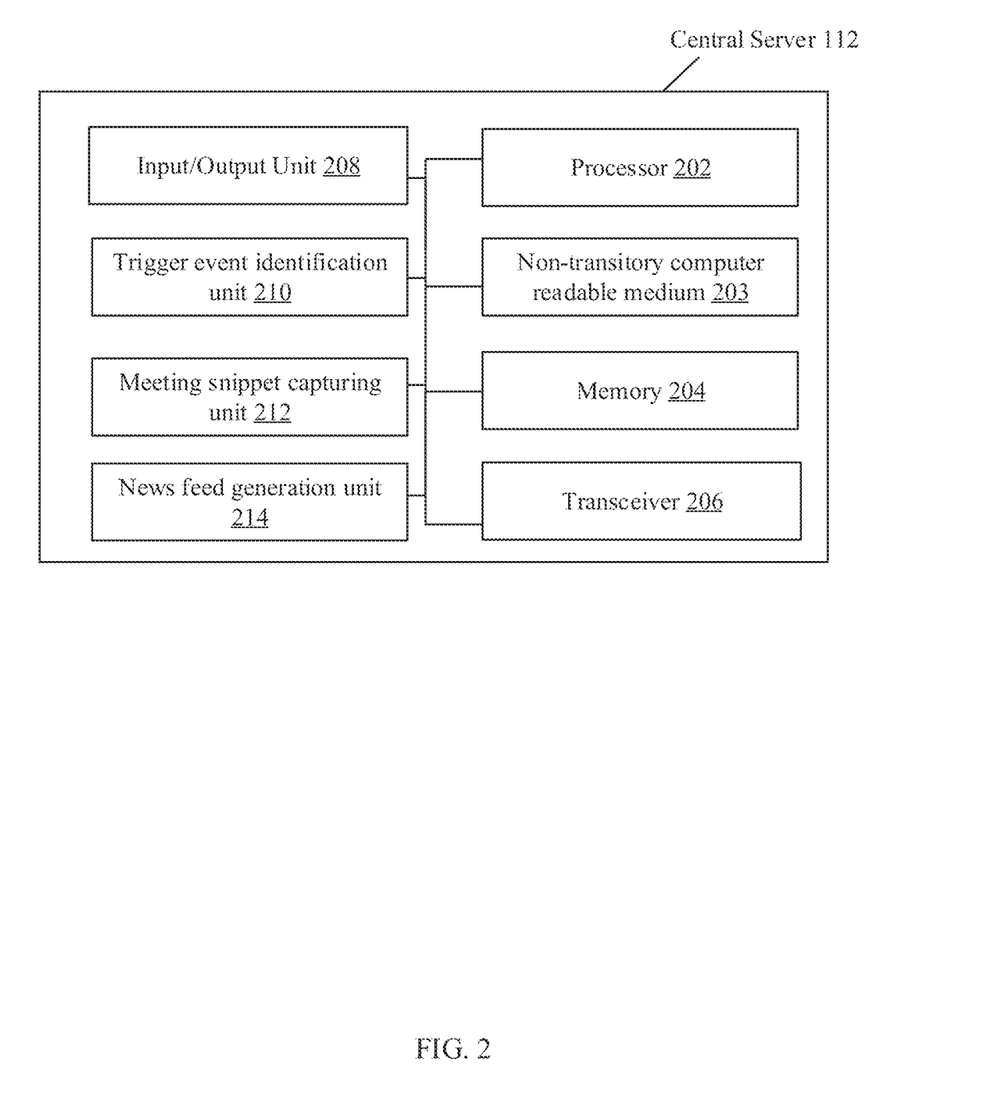
FIG. 2 is a block diagram that illustrates a central server configured to dynamically generate the news feed, in accordance with at least one exemplary embodiment of the disclosure.

FIG. 2 is a block diagram that illustrates a central server 112 configured to dynamically generating a news feed, in accordance with at least one exemplary embodiment of the disclosure. FIG. 2 has been explained in conjunction with the elements of FIG. 1. Referring to FIG. 2, there is shown the central server 112, which may include a processor 202, a non-transitory computer readable medium 203, a memory 204, a transceiver 206, an input/output unit 208, a trigger event identification unit 210, a meeting snippet capturing unit 212, and a news feed generation unit 214. The processor 202 may be communicatively coupled to the non-transitory computer readable medium 203, the memory 204, the transceiver 206, the input/output unit 208, the trigger event identification unit 210, the meeting snippet capturing unit 212, and the news feed generation unit 214 and may work in conjunction with each other to dynamically generate the news feed. Further, the transceiver 206 may be communicatively coupled to the communication network 108.

The processor 202 comprises suitable logic, circuitry, interfaces, and/or code that may be configured to execute a set of instructions stored in the memory 204. The processor 202 may be implemented based on several processor technologies known in the art. The processor 202 operates in coordination with the non-transitory computer readable medium 203, the transceiver 206, the input/output unit 208, the trigger event identification unit 210, the meeting snippet capturing unit 212, and the news feed generation unit 214 to dynamically generate the news feed. Examples of the processor 202 include, but not limited to, an X86-based processor, a Reduced Instruction Set Computing (RISC) processor, an Application-Specific Integrated Circuit (ASIC) processor, a Complex Instruction Set Computing (CISC) processor, and/or other processor.

The non-transitory computer readable medium 203 may include any tangible or non-transitory storage media or memory media such as electronic, magnetic, or optical media—e.g., disk or CD/DVD-ROM coupled to processor 202.

The memory 204 comprises suitable logic, circuitry, interfaces, and/or code that may be configured to store the set of instructions, which are executed by the processor 202. In an exemplary embodiment, the memory 204 may be configured to store one or more programs, routines, or scripts that are executed in coordination with the processor 202. The memory 204 may be implemented based on a Random Access Memory (RAM), a Read-Only Memory (ROM), a Hard Disk Drive (HDD), a storage server, and/or a Secure Digital (SD) card.

The transceiver 206 comprises of suitable logic, circuitry, interfaces, and/or code that may be configured to receive feedback on each of the one or more meeting snippets from the plurality of electronic devices, such as 102, 104 and 106 associated with the plurality of participants, such as Participant A 102a, Participant B 104a, and Participant C 106a during the meeting, via the communication network 108. The transceiver 206 may be further configured to transmit the dynamically generated news feed to the each of the plurality of electronic devices, such as 102, 104 and 106. Further, the transceiver 206 may be further configured to receive a selection of one or more categories from at least one participant from the plurality of participants, such as Participant A 102a, Participant B 104a, and Participant C 106a. The transceiver 206 may implement one or more known technologies to support wired or wireless communication with the communication network 108. In an exemplary embodiment, the transceiver 206 may include, but is not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The input/output unit 208 comprises suitable logic, circuitry, interfaces, and/or code that may be configured to display the dynamically generated news feed. The input/output unit 208 comprises of various input and output devices that are configured to communicate with the processor 202. Examples of the input devices include, but are not limited to, a keyboard, a mouse, a joystick, a touch screen, a microphone, a camera, and/or a docking station. Examples of the output devices include, but are not limited to, a display screen and/or a speaker. The display screen may be configured to display the dynamically generated news feed in a chronological manner to the plurality of participants, such as Participant A 102a, Participant B 104a, and Participant C 106a. Further, in an exemplary embodiment, the input/output unit 208 may be configured to render the one or more meeting snippets with ranking higher than a pre-defined threshold at top of chronological representation of the news feed.

The trigger event identification unit 210 comprises suitable logic, circuitry, interfaces, and/or code that may be configured to identify in real time a trigger event initiated by at least one participant of the meeting. In an exemplary embodiment, the trigger event may be indicative of at least a reference, by the participant, to the metadata associated with the meeting.

The meeting snippet capturing unit 212 comprises suitable logic, circuitry, interfaces, and/or code that may be configured to capture, during the meeting, the one or more meeting snippets based on identification of the trigger event. The meeting snippet capturing unit 212 may be configured to determine a timestamp associated with the trigger event. Further, the meeting snippet capturing unit 212 may be configured to capture a meeting snippet of one or more media snippets to include content of a first predetermined duration chronologically prior to the timestamp and content of a second predetermined duration chronologically after the timestamp.

The news feed generation unit 214 comprises suitable logic, circuitry, interfaces, and/or code that may be configured to dynamically generate the news feed based on the captured one or more meeting snippets and the feedback. The news feed generation unit 214 may be configured to perform ranking of each of the one or more meeting snippets based on the feedback. In an exemplary embodiment, the feedback may be captured based on the one or more interactions received from the plurality of participants, such as Participant A 102a, Participant B 104a, and Participant C 106a. In an exemplary embodiment, the one or more interactions may comprise at least one of: a number of likes, a number of comments, and a number of times the meeting snippets are shared on one or more social network platforms or enterprise platforms.

The news feed generation unit 214 may be configured to mark at least one meeting snippet as private based on an input received from the participant, such as Participant A 102a. Further, the news feed generation unit 214 may be configured to remove the at least one meeting snippet that may be marked as private based on the input received from the participant, such as Participant A 102a. The news feed generation unit 214 may be configured to categorize the news feed into one or more categories based on the transcript generated from the meeting data and the agenda of the meeting. In an exemplary embodiment, the meeting data and the agenda of the meeting may be collectively referred to as the metadata associated with the meeting. In an exemplary embodiment, the meeting data may comprise audio content, video content, meeting notes, presentation content, screen sharing content, and/or file sharing content.

The news feed generation unit 214 may be configured to receive a selection of one or more categories from at least one participant from the plurality of participants. Further, the news feed generation unit 214 may be configured to generate the news feed associated with each of the selected one or more categories and display the news feed to the at least one participant from the plurality of participants. In an exemplary embodiment, the news feed generation unit 214 may be configured to identify one or more relevant categories of news feed associated with the plurality of participants. In an exemplary embodiment, the one or more relevant categories may be derived by using machine learning techniques on participant preferences associated with each of the plurality of participants.

In operation, the plurality of electronic devices, such as 102, 104 and 106 may enable the plurality of participants, such as Participant A 102a, Participant B 104a, and Participant C 106a to connect to the meeting for working collaboratively and to discuss one or more topics during the meeting. In an exemplary embodiment, the plurality of electronic devices, such as 102, 104 and 106, may enable the plurality of participants, such as Participant A 102a, Participant B 104a, and Participant C 106a to share an agenda of the meeting with each of the plurality of participants. The agenda of meeting may be shared during the meeting or may be shared prior to the meeting. For example, the agenda of the meeting (between Participant A 102a, Participant B 104a, and Participant C 106) that may be scheduled for 2 hours on Dec. 31, 2020 from 11 am to 1 pm may include the below mentioned points:

Decide Software rollout date
Current project status
Identify Unique Selling Point (USP) to create marketing material Further, in an exemplary embodiment, during the meeting, the plurality of electronic devices, such as 102, 104 and 106 may enable the plurality of participants, such as Participant A 102a, Participant B 104a, and Participant C 106a to share at least one of the audio content, the video content, the meeting notes, the presentation content, the screen sharing content, and/or the file sharing content with each of the plurality of participants. Additionally, each of the plurality of participants, such as Participant A 102a, Participant B 104a, and Participant C 106a may speak during the meeting and may perform one or more annotations to the content being shared. In an exemplary embodiment, the audio content, the video content, the meeting notes, the presentation content, the one or more annotations, the screen sharing content, and/or the file sharing content may be collectively referred as the meeting data. Further, metadata associated with the meeting may comprise at least one of the meeting data and the agenda of the meeting.

Once the meeting is in progress, each of the plurality of electronic devices, such as 102, 104 and 106 may be configured to transmit the metadata associated with the meeting to the central server 112 in real-time. In an exemplary embodiment, the plurality of electronic devices, such as 102, 104 and 106 may transform the metadata in text format. For example, the audio content, received from the computing devices, may be converted to text using one or more speech to text techniques (STT). Similarly, the video content and/or screen sharing content (received from the electronic devices) may be converted to text using optical character recognition techniques. In some examples, the text obtained from the meeting data may be referred to as the transcript of the meeting. Alternatively, the trigger event identification unit 210 may receive the metadata from the plurality of electronic devices, such as 102, 104 and 106 and transform the metadata in the text format.

The trigger event identification unit 210 may be configured to identify in real-time a trigger event initiated by at least one participant, such as Participant A 102a of the meeting. In an exemplary embodiment, the trigger event may be indicative of at least a reference, by the at least one participant, such as Participant A 102a, to the metadata associated with the meeting.

For example, the Participant A 102a has shared a slide deck (i.e. the presentation content) amongst the plurality of participants, such as Participant A 102a, Participant B 104a, and Participant C 106a during the meeting and the Participant A 102a speaks (i.e. the audio content) at time 12:07 pm that "We need to ensure that rollout of this software must happen by end of the week" and Participant B 104a speaks "Feature 1 is the unique selling point for us" at 12:11 pm. As can be seen from the example above, the Participant A 102a and Participant B 104a have made a reference to the metadata associated with the meeting.

The trigger event identification unit 210 may be configured to compare the transcript (text obtained from the meeting data) with the meeting metadata. In an exemplary embodiment, the trigger event may be indicative of at least a reference, by the participant, to the metadata associated with the meeting. In an exemplary embodiment, the trigger event may correspond to a time instant, during the meeting, at which a meeting metadata was discussed by a participant. Based on the comparison, the trigger event identification unit 210 may be configured to identity or determine that the Participant A 102a and Participant B 104a has made reference to the metadata (i.e. presentation content) at time 12:07 pm and 12:11 pm, respectively.

Upon identification of the trigger event, the trigger event identification unit 210 may be configured to record the meeting for a determined duration to capture a meeting snippet. In an exemplary embodiment, the trigger event identification unit 210 may be configured to determine a timestamp associated with the trigger event. Further, the trigger event identification unit 210 may be configured to capture the meeting snippet of one or more media snippets to include content of a first predetermined duration chronologically prior to the timestamp and content of a second predetermined duration chronologically after the timestamp.

For example, continuing from the previous example, the Participant A 102a and Participant B 104a may have made the reference to the metadata at 12:07 pm and 12:11 pm, respectively, then the trigger event identification unit 210 may capture a meeting snippet that includes media content that is presented and/or discussed ten seconds before and after the timestamp of 12:07 pm and 12:11 pm. In the aforementioned example, the meeting snippet that may be captured includes the audio content of Participant A 102a, the presentation content to which the Participant A 102a had referred to during the meeting, and the audio content of Participant B 104a. In an exemplary embodiment, the meeting snippet may correspond to a recording of a portion of the meeting as illustrated in the above example. The meeting snippet may be of a determined duration. In some examples, the meeting snippet may include the meeting data generated during the determined duration. During the meeting, the trigger event identification unit 210 may capture the plurality of meeting snippets.

After the one or more meeting snippets are captured, the transceiver 206 may be configured to transmit the captured one or more meeting snippets to the plurality of electronic devices, such as 102, 104 and 106 and display during the meeting, the one or more meeting snippets as a news feed to the plurality of participants, such as Participant A 102a, Participant B 104a, and Participant C 106a. For example, during the meeting the audio content spoken by Participant A 102a and Participant B 104a, the slide deck to which the Participant A 102a had referred to may be shared with the plurality of participants, such as Participant A 102a, Participant B 104a, and Participant C 106a. In an exemplary embodiment, two audio content files (Meeting Snippet A and Meeting Snippet B) and an image of the slide deck (Meeting Snippet C) may be displayed as meeting snippets in the form of news feed to the plurality of participants, such as Participant A 102a, Participant B 104a, and Participant C 106a.

Further, in an exemplary embodiment, each of the plurality of electronic devices, such as 102, 104 and 106, may enable each of the plurality of participants, such as Participant A 102a, Participant B 104a, and Participant C 106a to provide feedback associated with each of the one or more meeting snippets in the news feed. In an exemplary embodiment, the plurality of electronic devices, such as 102, 104 and 106, may capture the feedback based on one or more interactions received from the plurality of participants, such as Participant A 102a, Participant B 104a, and Participant C 106a.

In an exemplary embodiment, the one or more interactions may comprise at least one of: a number of likes, a number of comments, and a number of times the meeting snippets are shared on one or more social network platforms or enterprise platforms. Below Table 1 may be an exemplary feedback table.

TABLE 1

|  | Number of likes | Number of comments | Number of times shared |
| --- | --- | --- | --- |
| Meeting Snippet A | 10 | 54 | 178 |
| Meeting Snippet B | 23 | 10 | 2 |
| Meeting Snippet C | 78 | 69 | 134 |

The transceiver 206 may be configured to receive the feedback on each of the one or more meeting snippets provided by the plurality of participants, such as Participant A 102a, Participant B 104a, and Participant C 106a during the meeting from the plurality of electronic devices, such as 102, 104 and 106.

Upon receiving the feedback, the news feed generation unit 214 may be configured to perform ranking of each of the one or more meeting snippets based on the feedback. In an exemplary embodiment, one or more machine learning or deep learning techniques may be utilized to perform ranking of the one or more meeting snippets. For example, a score may be computed for each meeting snippet by assigning a determined weighted component for each of the one or more interactions and then a weighted average may be determined to compute the score. Below Table 2 illustrates an exemplary embodiment to perform ranking of each of the one or more meeting snippets.

TABLE 2

|  | Number of likes (weight = 0.3) | Number of comments (weight = 0.8) | Number of times shared (weight = 0.5) | Score |
| --- | --- | --- | --- | --- |
| Meeting Snippet A | 10 * 0.3 = 3 | 54 * 0.8 = 43.2 | 178 * 0.5 = 89 | 3 + 43.2 + 89 = 135.2 |
| Meeting Snippet B | 23 * 0.3 = 6.9 | 10 * 0.8 = 8 | 2 * 0.5 = 1 | 6.9 + 8 + 1 = 15.9 |
| Meeting Snippet C | 78 * 0.3 = 23.4 | 69 * 0.8 = 55.2 | 134 * 0.5 = 67 | 23.4 + 55.2 + 67 = 145.6 |

From the above Table 2, the Meeting Snippet C is ranked first, followed by the Meeting Snippet A and then last by the Meeting snippet B. Upon performing ranking of the one or more meeting snippets, the news feed generation unit 214 may be configured to dynamically generate the news feed based on the captured one or more meeting snippets and the feedback. For example, the news feed generation unit 214 may generate the dynamic news feed that includes only the Meeting Snippet C and the Meeting Snippet A. Further, the news feed generation unit 214 may be configured to categorize the news feed into the one or more categories based on the transcript generated from the meeting data. For example, the news feed generation unit 214 may identify two categories, such as Rollout date, and USP based on the transcript. Further, the news feed generation unit 214 may be configured to associate the Meeting Snippet A with category 1: Rollout date and associate Meeting Snippet B and Meeting Snippet C with category 2: USP.

After the categorization and generation of the news feed, the transceiver 206 may be configured to transmit the one or more categories and the one or more meeting snippets in the dynamic news feed to each of the plurality of electronic devices, such as 102, 104 and 106. In an exemplary embodiment, the input/output unit 208 may be configured to display the dynamically generated news feed. Further, in an exemplary embodiment, the plurality of electronic devices, such as 102, 104 and 106, may be configured to display the dynamically generated news feed to the plurality of participants, such as Participant A 102a, Participant B 104a, and Participant C 106a. For example, the plurality of electronic devices, such as 102, 104 and 106 may display the dynamic news feed that includes only the Meeting Snippet C and the Meeting Snippet A to the plurality of participants, such as Participant A 102a, Participant B 104a, and Participant C 106a.

Further, the news feed generation unit 214 may be configured to generate the dynamic news feed that may include one or more meeting snippets comprising a plurality of categories. Additionally, in an exemplary embodiment, the news feed generation unit 214 may be configured to generate a plurality of dynamic news feeds and each of the plurality of dynamic news feeds may include meeting snippets associated only with a particular category from the plurality of categories. For example, News feed 1 may include meeting snippets (Meeting Snippet A) associated with category 1: Rollout date and News feed 2 may include meeting snippets (Meeting Snippet B and Meeting Snippet C) associated with category 2: USP.

Further, the news feed generation unit 214 may be configured to identify one or more relevant categories of news feed associated with the plurality of participants, such as Participant A 102a, Participant B 104a, and Participant C 106a. In an exemplary embodiment, the one or more relevant categories may be derived by using machine learning techniques on participant preferences associated with each of the plurality of participants and the one or more interactions of the participants on the meeting snippets. For example, if the Participant A 102a shares the Meeting Snippet B on a social media platform, then the news feed generation unit 214 may identify that the relevant category for Participant A 102a may be category 2: USP. Upon identification of the relevant category for Participant A 102a, the news feed generation unit 214 may include the Meeting Snippet C in the news feed that is being displayed for Participant A 102a. Thus, the news feed for Participant A 102a may be dynamically generated.

Additionally, the news feed generation unit 214 may be configured to provide one or more recommendations including one or more categories that may be of relevance to each of the plurality of participants, such as Participant A 102a, Participant B 104a, and Participant C 106a. For example, if Participant C 106a has commented on the Meeting Snippet C (image of the slide deck) asking "What would be the roll out date for the software", then the news feed generation unit 214 may be configured to recommend "category 1: Rollout date" to the Participant C 106a.

Based on the provided recommendation, the plurality of electronic devices, such as 102, 104 and 106 may enable the plurality of participants, such as Participant A 102a, Participant B 104a, and Participant C 106a to provide a selection of the one or more categories to the news feed generation unit 214. The news feed generation unit 214 may be configured to receive the selection of the one or more categories from the plurality of participants and provide a news feed associated with each of the selected one or more categories to each of the plurality of participants, such as Participant A 102a, Participant B 104a, and Participant C 106a. For example, if the recommended category (category 1: Rollout date) for Participant C 106a is selected by the Participant C 106a, then the news feed of Participant C 106a is dynamically updated to include the Meeting Snippet A that is associated with category 1: Rollout date.

In an exemplary embodiment, the input/output unit 208 or each of the plurality of electronic devices, such as 102, 104 and 106 may render the news feed in a chronological manner to the plurality of participants, such as Participant A 102a, Participant B 104a, and Participant C 106a. For example, the one or more meeting snippets included in the news feed may be displayed in accordance with the time instant at which the one or more meeting snippets were captured. Meeting Snippet A may be captured at 12:07, Meeting Snippet B may be captured at 12:11, and Meeting Snippet C may be captured at 12:13, then the news feed may chronologically display the one or more meeting snippets where Meeting Snippet A is displayed first followed by Meeting Snippet B and then followed by Meeting Snippet C. In an exemplary embodiment, the input/output unit 208 or each of the plurality of electronic devices, such as 102, 104 and 106 may render the one or more meeting snippets with ranking higher than a pre-defined threshold at top of chronological representation of the news feed. For example, based on the computed ranking as discussed earlier, the Meeting Snippet C may be displayed first followed by Meeting Snippet A and then followed by Meeting Snippet B.

In an exemplary embodiment, the plurality of electronic devices, such as 102, 104 and 106, may enable the plurality of participants, such as Participant A 102a, Participant B 104a, and Participant C 106a to provide an input to mark at least one meeting snippet from the one or more meeting snippets as private. The news feed generation unit 214 may be configured to receive such input associated with at least one meeting snippet from the one or more meeting snippets and based on such received input the news feed generation unit 214 may be configured to remove the at least one meeting snippet from the dynamically generated news feed. For example, if Participant A 102a marks Meeting Snippet A as private then the Meeting Snippet A will not be included in any of the dynamically generated news feeds and if the before marking of the Meeting Snippet A as private, the Meeting Snippet A was included in the news feed, then the news feed generation unit 214 may be configured to remove the Meeting Snippet A from the news feed.

In an exemplary embodiment, the dynamic news feed disclosed herein may be displayed on a web-based user interface. The dynamic news feed may enable the plurality of participants, such as Participant A 102a, Participant B 104a, and Participant C 106a to understand or know about trending topics, organization level decisions, and/or outcomes from the meetings. Further, the plurality of participants, such as Participant A 102a, Participant B 104a, and Participant C 106a may subscribe to one or more categories that may be of interest to each of the plurality of participants. Further, the dynamically generated news feed may highlight the most important and key decisions, and topics from the organization by displaying the dynamically generated news feed to each of the plurality of participants, such as Participant A 102a, Participant B 104a, and Participant C 106a. In an exemplary embodiment, the dynamically generated news feed may be restricted for displaying only within participants that are within the organization. A person skilled in the art will understand that the scope of the disclosure should not be limited to dynamically generating the news feed based on the aforementioned factors and using the aforementioned techniques. Further, the examples provided are for illustrative purposes and should not be construed to limit the scope of the disclosure.

Figure 3:
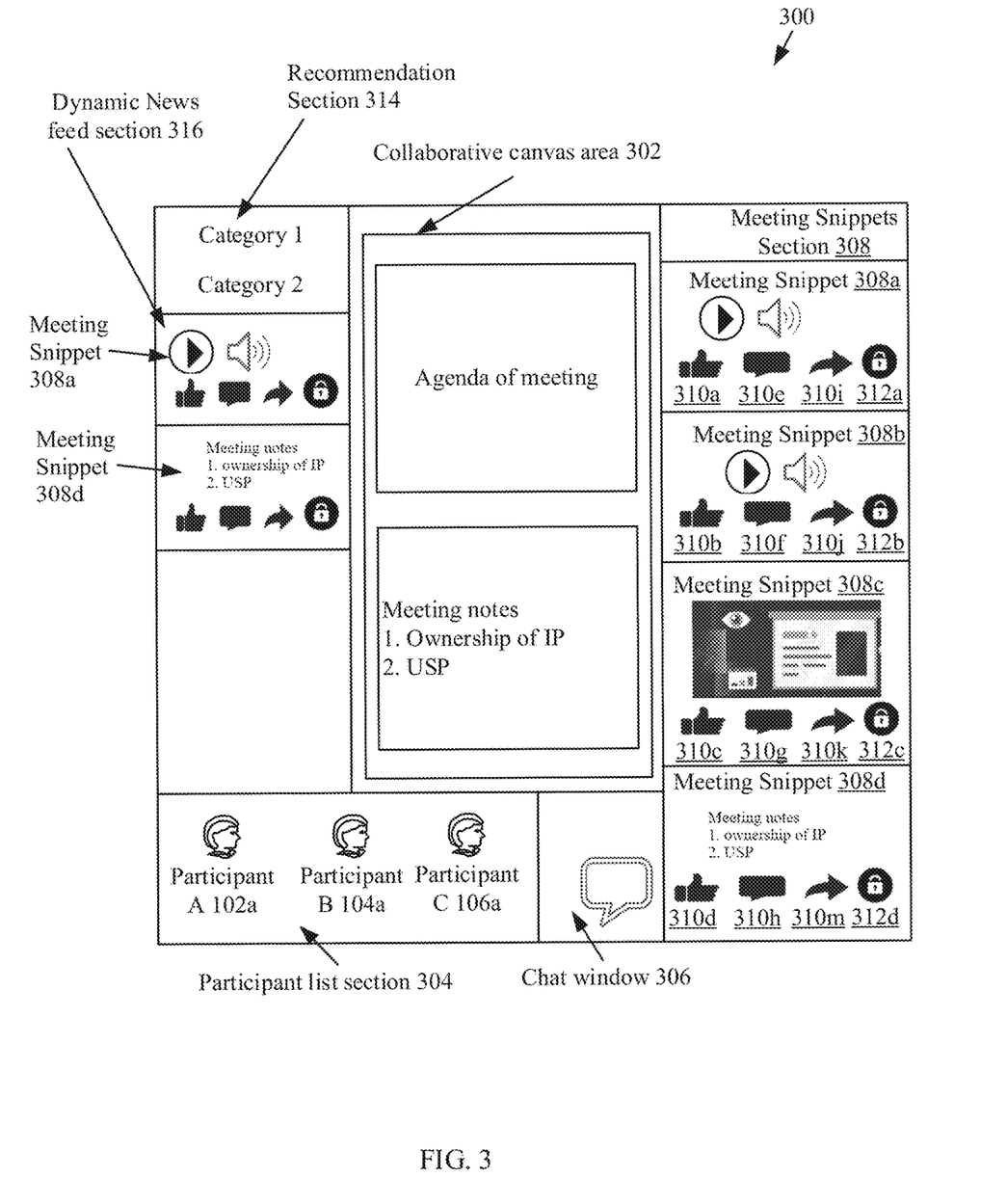
FIG. 3 illustrates an exemplary scenario of implementation of displaying the dynamically generated news feed to the plurality of participants, in accordance with at least one exemplary embodiment of the disclosure.

FIG. 3 illustrates an exemplary scenario of implementation of displaying the dynamically generated news feed to the plurality of participants, in accordance with at least one exemplary embodiment of the disclosure. FIG. 3 is explained in conjunction with the elements of FIG. 1 and FIG. 2. Referring to FIG. 3, there is shown an exemplary scenario where the plurality of electronic devices, such as 102, 104 and 106 may enable three participants, such as Participant A 102a, Participant B 104a, and Participant C 106a to join the meeting. The graphical user interface 300 illustrates the various user interface elements that may be displayed to the three participants, such as Participant A 102a, Participant B 104a, and Participant C 106a. The graphical user interface 300 may include a collaborative canvas area 302, a participant list section 304, a chat window 306, a meeting snippets section 308, a plurality of user interface elements, such as 310a, 310b, 310c, 310d, 310e, 310f, 310g, 310h, 310i, 310j, 310k, 310m, a control button 312, a recommendation section 314, and a dynamic news feed section 316.

The collaborative canvas area 302 may be an area where the three participants, such as such as Participant A 102a, Participant B 104a, and Participant C 106a may collaborate and share content during the meeting. The participant list section 304 may display details of participants, such as Participant A 102a, Participant B 104a, and Participant C 106a that may be currently working collaboratively in the meeting. In an exemplary embodiment, metadata about each of the participants, such as Participant A 102a, Participant B 104a, and Participant C 106a may be displayed in the participant list section 304. In an exemplary embodiment, such metadata may comprise an image of the participant, a name of the participant, an organization name of the participant, a designation of the participant, and the like.

The chat window 306 may enable the plurality of participants, such as Participant A 102a, Participant B 104a, and Participant C 106a that have joined the meeting to have conversations with each other and discuss about the meeting agenda and any other relevant information. The meeting snippets section 308 may display the captured one or more meeting snippets, such as 308a, 308b, 308c, and 308d based on identification of the trigger event. Further, along with each of the one or more meeting snippets, such as 308a, 308b, 308c, and 308d a plurality of user interface elements, such as 310a, 310b, 310c, 310d, 310e, 310f, 310g, 310h, 310i, 310j, 310k, 310m may be displayed. The plurality of user interface elements, such as 310a, 310b, 310c, 310d, 310e, 310f, 310g, 310h, 310i, 310j, 310k, 310m may be utilized to receive feedback from the three participants, such as Participant A 102a, Participant B 104a, and Participant C 106a

Further, a control button, such as 312a, 312b, 312c, and 312d may displayed alongside each of the one or more meeting snippets, such as 308a, 308b, 308c, and 308d to receive input from the participants with regard to privacy of the meeting snippet. In an exemplary embodiment, the control button 312a may be associated with meeting snippet 308a. Further, the control button 312b may be associated with meeting snippet 308b. Further, the control button 312c may be associated with meeting snippet 308c. Further, the control button 312d may be associated with meeting snippet 308d. Further, the recommendation section 314 may display one or more categories that may be of relevance to the Participant A 102a, Participant B 104a, and Participant C 106a. Additionally, the dynamic news feed section 318 may display the dynamically generated news feed comprising the one or more meeting snippets for each of the three participants, such as Participant A 102a, Participant B 104a, and Participant C 106a.

In operation, Participant A 102a may share a slide deck to discuss one or more topics included in the slide deck. Further, Participant B 104a may annotate the slide deck by inserting meeting notes during the meeting. Further, Participant C 106a may speak "Who owns the Intellectual Property for this product" and in response the Participant A 102a may speak "The client owns the Intellectual Property for this product". The central server 112 may be configured to identify in real time the trigger event of the references made to metadata associated with the meeting by the three participants, such as Participant A 102a, Participant B 104a, and Participant C 106a.

Upon identification of the trigger event, the central server 112 may be configured to capture one or more meeting snippets based on identification of the trigger event. For example, the captured one or more snippets may include the slide deck 308a, annotations 308b, Audio 308c of Participant C 106a, and Audio 308d of Participant A 102a. Now the one or more snippets 308a, 308b, 308c, and 308d may be displayed to the three participants, such as Participant A 102a, Participant B 104a, and Participant C 106a in the dynamic news feed section 318.

After the news feed including the one or more snippets 308a, 308b, 308c, and 308d may be displayed, then the Participant A 102a, Participant B 104a, and Participant C 106a may provide feedback associated with the one or more meeting snippets, such as 308a, 308b, 308c, and 308d by interacting with the plurality of user interface elements, such as 310a, 310b, 310c, 310d, 310e, 310f, 310g, 310h, 310i, 310j, 310k, 310m. For example, the user interface elements 310a, 310d, 310g, and 310j may be utilized to provide a like associated with the meeting snippet 308a, 308b, 308c, and 308d, respectively. Further, the user interface elements 310b, 310e, 310h, and 310k may be utilized provide a comment associated with the meeting snippet 308a, 308b, 308c, and 308d, respectively. Additionally, user interface elements 310c, 310f, 310i, and 310m may be utilized to share the meeting snippets 308a, 308b, 308c, and 308d, respectively on one or more social network platforms or enterprise platforms. In an exemplary embodiment, the Participant C 106a may click on the control button 312b to mark the meeting snippet 308b as private.

After receiving feedback from the three participants, such as Participant A 102a, Participant B 104a, and Participant C 106a, the central server 112 may be configured to dynamically generate the news feed. Based on the feedback (likes, share, comments) received from the three participants, such as Participant A 102a, Participant B 104a, and Participant C 106a associated with the one or more meeting snippets, such as 308a, 308b, 308c, and 308d the meeting snippet 308a (slide deck) and meeting snippet 308d (Audio of Participant A 102a) may be identified to be included in the dynamic news feed based on the ranking. Thus, as shown in FIG. 3 in the dynamic news feed section 316, the meeting snippet 308a may be displayed first followed by the meeting snippet 308d as rank of meeting snippet 308a is higher than that of meeting snippet 308d. The meeting snippet 308c is not included in the dynamic news feed as ranking of the meeting snippet 308c may not be above a pre-defined threshold. Additionally, as Participant C 106a has marked the meeting snippet 308b as private hence the news feed generation unit 214 may not display the meeting snippet 308b in the dynamic news feed.

In an exemplary embodiment, the Participant B 104a may click on the displayed one or more categories, such as Questions 316a in the recommendation section 316 to view one or more meeting snippets that may be related to the selected category in the dynamic news feed. Based on the received input from the Participant B 104a, the central server 112 may dynamically update the news feed for the Participant B 104a to include the meeting snippet 308c.

Figure 4:
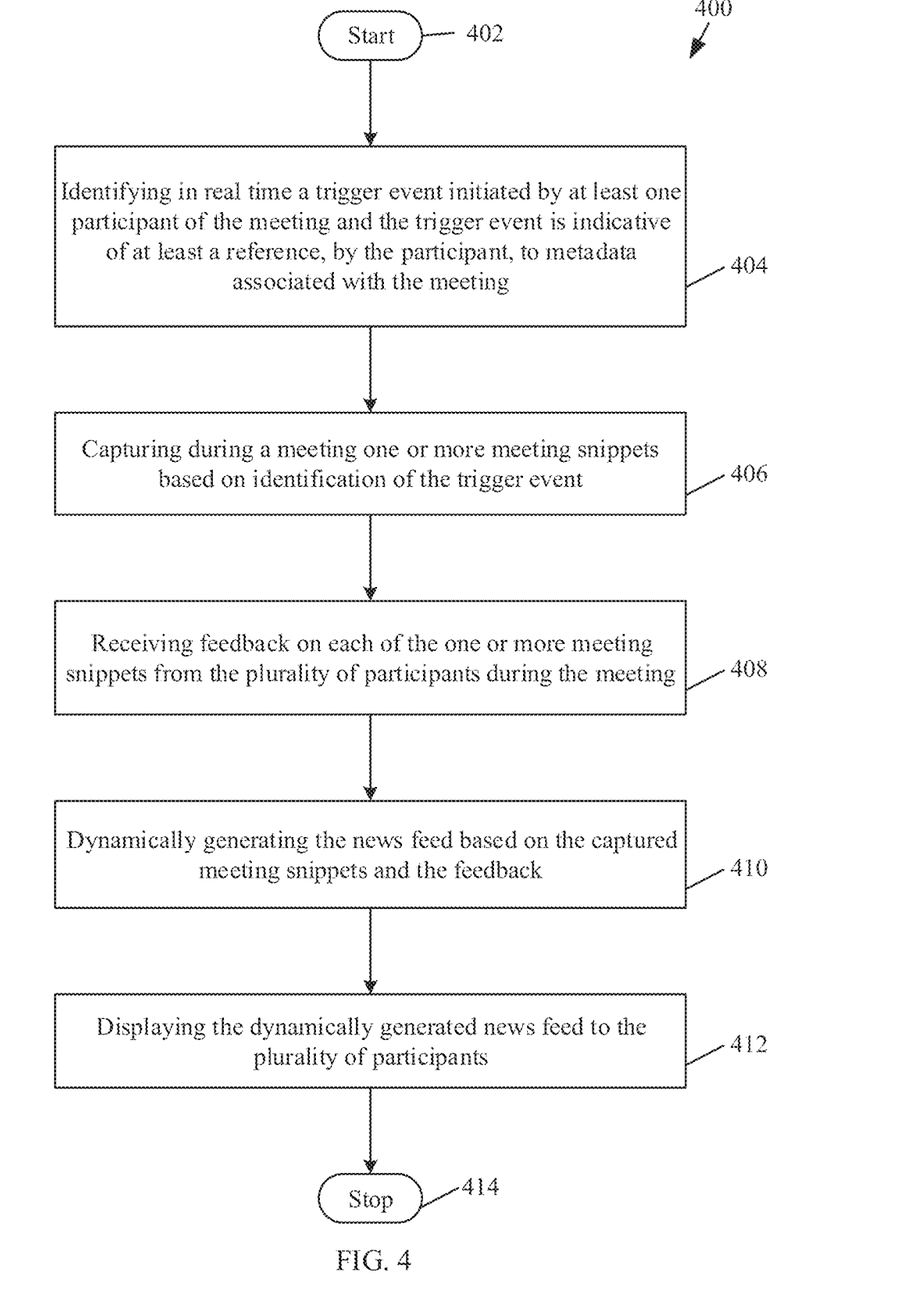
FIG. 4 is a flowchart that illustrates a method for displaying the dynamically generated news feed to the plurality of participants, in accordance with at least one exemplary embodiment of the disclosure.

FIG. 4 is a flowchart that illustrates a method 400 for displaying a dynamically generated news feed to a plurality of participants, in accordance with at least one exemplary embodiment of the disclosure. Referring to FIG. 4, the method starts at 402 and proceeds to 404. At 404, a central server 112 may be configured to identify, in real time, a trigger event initiated by at least one participant of the meeting and the trigger event may be indicative of at least a reference, by the participant, to metadata associated with the meeting. At 406, the central server 112 may be configured to capture during a meeting one or more meeting snippets based on identification of the trigger event. At 408, the central server 112 may be configured to receive feedback on each of the one or more meeting snippets from the plurality of participants during the meeting. At 410, the central server 112 may be configured to dynamically generating the news feed based on the captured meeting snippets and the feedback. At 412, the central server 112 may be configured to display the dynamically generated news feed to the plurality of participants. Control passes to end operation 414.

Figure 5:
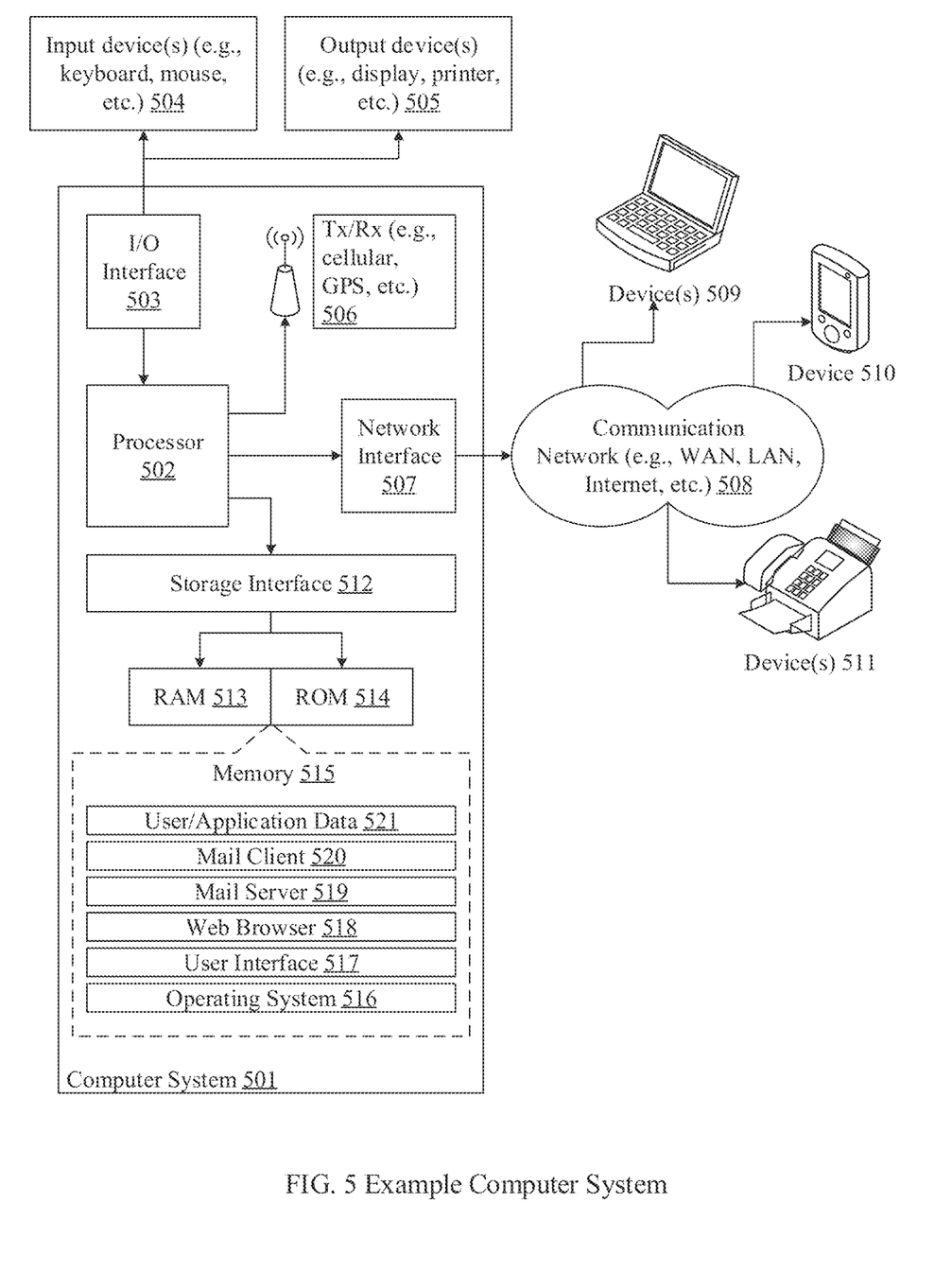
FIG. 5 is a block diagram of an exemplary computer system for dynamically generating the news feed, in accordance with various exemplary embodiments of the present disclosure.

FIG. 5 is a block diagram of an exemplary computer system for implementing a dynamically generated news feed, in accordance with various exemplary embodiments of the present disclosure. Referring to FIG. 5, there is shown an exemplary computer system 501, which may comprise a central processing unit ("CPU" or "processor") 502, an I/O interface 503, an input device 504, an output device 505, a transceiver 506, a network interface 507, a communication network 508, devices, such as 509, 510 and 511, storage interface 512, one or more memory devices, such as RAM 513, ROM 514, and memory device 515.

Variations of computer system 501 may be used for dynamically generating a news feed. The computer system 501 may comprise a central processing unit ("CPU" or "processor") 502. Processor 502 may comprise at least one data processor for executing program components for executing user- or system-generated requests. A user may include a person, a person using a device such as those included in this disclosure, or such a device itself. The processor 502 may include specialized processing units such as integrated system (bus) controllers, memory management control units, floating point units, graphics processing units, digital signal processing units, etc. The processor 502 may include a microprocessor, such as AMD Athlon, Duron or Opteron, ARM's application, embedded or secure processors, IBM PowerPC, Intel's Core, Itanium, Xeon, Celeron or other line of processors, etc. The processor 502 may be implemented using mainframe, distributed processor, multi-core, parallel, grid, or other architectures. Some exemplary embodiments may utilize embedded technologies like application-specific integrated circuits (ASICs), digital signal processors (DSPs), Field Programmable Gate Arrays (FPGAs), etc.

Processor 502 may be disposed in communication with one or more input/output (I/O) devices via I/O interface 503. The I/O interface 503 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 503, the computer system 501 may communicate with one or more I/O devices. For example, the input device 504 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 505 may be a printer, fax machine, video display (e.g., cathode ray tube (CRT), liquid crystal display (LCD), light-emitting diode (LED), plasma, or the like), audio speaker, etc. In some exemplary embodiments, a transceiver 506 may be disposed in connection with the processor 502. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some exemplary embodiments, the processor 502 may be disposed in communication with a communication network 508 via a network interface 507. The network interface 507 may communicate with the communication network 508. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 508 may include, without limitation, a direct interconnection, local area network (LAN), wide area network (WAN), wireless network (e.g., using Wireless Application Protocol), the Internet, etc. Using the network interface 507 and the communication network 508, the computer system 501 may communicate with devices 509, 510, and 511. These devices may include, without limitation, personal computer(s), server(s), fax machines, printers, scanners, various mobile devices such as cellular telephones, smartphones (e.g., Apple iPhone®, Blackberry®, Android®-based phones, etc.), tablet computers, eBook readers (Amazon Kindle®, Nook, etc.), laptop computers, notebooks, gaming consoles (Microsoft Xbox®, Nintendo DS®, Sony PlayStation®, etc.), or the like. In some exemplary embodiments, the computer system 1101 may itself embody one or more of these devices.

In some exemplary embodiments, the processor 502 may be disposed in communication with one or more memory devices (e.g., RAM 513, ROM 514, etc.) via a storage interface 512. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 516, user interface application 517, web browser 518, mail server 519, mail client 520, user/application data 521 (e.g., any data variables or data records discussed in this disclosure), etc. The operating system 516 may facilitate resource management and operation of the computer system 501. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 517 may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some exemplary embodiments, the computer system 501 may implement a web browser 1118 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some exemplary embodiments, the computer system 501 may implement a mail server 519 stored program component. The mail server may be an Internet mail server such as Microsoft Exchange, or the like. The mail server may utilize facilities such as ASP, ActiveX, ANSI C++/C #, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some exemplary embodiments, the computer system 401 may implement a mail client 520 stored program component. The mail client may be a mail viewing application, such as Apple Mail, Microsoft Entourage, Microsoft Outlook, Mozilla Thunderbird, etc.

In some exemplary embodiments, computer system 501 may store user/application data 1121, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

Furthermore, one or more computer-readable storage media may be utilized to implement various exemplary embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform operations or stages consistent with the exemplary embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Various exemplary embodiments of the disclosure encompass numerous advantages including methods and systems for dynamically generating a news feed. In an exemplary embodiment, the methods and systems may capture important meeting snippets from online meetings and get feedback from the plurality of participants and generate the dynamic news feed based on the captured meeting snippets and the feedback. In contrast to the conventional approaches, the dynamic news feed utilizes machine learning techniques based on relevant categories associated with the participants. Thus, the efficacy of system while dynamically generating a news feed is improved. Additionally, the generated dynamic news feed is more relevant and may include provide all the relevant information in a coherent and consolidated manner to the plurality of participants.

Disclosed methods and systems effectively identify in real-time a trigger event (reference, by the participant, to metadata associated with the meeting) initiated by at least one participant of the meeting and one or more meting snippets are captured during the online meeting. Conventional tools fail to capture such meeting snippets from the meetings and thus cannot generate a news feed that may include relevant information that was discussed in the meeting.

Thus, the claimed operations as discussed above are not routine, conventional, or well understood in the art, as the claimed operation enable the following solutions to the existing problems in conventional technologies.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted for carrying out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned operations and/or system modules may be suitably replaced, reordered, or removed, and additional operations and/or system modules may be inserted, depending on the needs of a particular application. In addition, the systems of the aforementioned exemplary embodiments may be implemented using a wide variety of suitable processes and system modules, and are not limited to any particular computer hardware, software, middleware, firmware, microcode, and the like. The claims can encompass exemplary embodiments for hardware and software, or a combination thereof.

While the present disclosure has been described with reference to certain exemplary embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular exemplary embodiment disclosed, but that the present disclosure will include all exemplary embodiments falling within the scope of the appended claims.

What is claimed is:

1. A method for generating a news feed, the method comprising:
    identifying, by a processor in real time, a trigger event initiated by at least one participant of a meeting, wherein the trigger event is indicative of at least a reference, by the participant, to meeting metadata associated with the meeting;
    capturing, during a meeting by the processor, one or more meeting snippets based on identification of the trigger event;
    receiving, by the processor, feedback on each of the meeting snippets from a plurality of participants during the meeting;
    dynamically generating, by the processor, a news feed during the meeting based on the captured one or more meeting snippets and the feedback received from the plurality of participants on the captured one or more meeting snippets during the meeting; and
    displaying, by the processor, the dynamically generated news feed to the plurality of participants.

2. The method of claim 1, further comprising receiving, by the processor, an input from a participant, wherein the input is indicative of marking at least one meeting snippet from the one or more meeting snippets as private, and wherein the at least one meeting snippet marked as private are removed from the news feed.

3. The method of claim 1, wherein dynamically generating, by the processor, of the news feed comprises ranking each of the one or more meeting snippets based on the feedback, wherein the feedback is captured using one or more interactions from the plurality of participants, wherein the one or more interactions comprise at least one of: a number of likes, a number of comments, a number of times the meeting snippets are shared on one or more social network platforms or enterprise platforms.

4. The method of claim 1, further comprising rendering, by the processor, the news feed in a chronological manner to the plurality of participants.

5. The method of claim 1, further comprising rendering, by the processor, the one or more meeting snippets with ranking higher than a pre-defined threshold at top of chronological representation of the news feed.

6. The method of claim 1, further comprising categorizing, by the processor, the news feed into one or more categories based on meeting transcript generated from meeting data.

7. The method of claim 6, wherein the metadata associated with the meeting comprises at least one of: the meeting data and an agenda of the meeting, and wherein the meeting data comprises audio content, video content, meeting notes, presentation content, screen sharing content, or file sharing content.

8. The method of claim 1, wherein capturing the one or more meeting snippets comprises:
    determining, by the processor, a timestamp associated with the trigger event; and
    capturing, by the processor, a meeting snippet of the one or more meeting snippets to include content of a first predetermined duration chronologically prior to the timestamp and content of a second predetermined duration chronologically after the timestamp.

9. The method of claim 1, further comprising:
    receiving, by the processor, a selection of one or more categories from at least one participant from the plurality of participants; and
    providing, by the processor, a news feed associated with each of the selected one or more categories to the at least one participant from the plurality of participants.

10. The method of claim 9, further comprising identifying, by the processor, one or more relevant categories of the news feed associated with the plurality of participants, wherein the one or more relevant categories are derived by using machine learning techniques on participant preferences associated with each of the plurality of participants.

11. A central server, comprising:
    a hardware processor; and
    a memory communicatively coupled to the hardware processor, wherein the memory stores processor instructions, which, on execution, causes the hardware processor to:
    identify in real time, a trigger event initiated by at least one participant of a meeting, wherein the trigger event is indicative of at least a reference, by the participant, to meeting metadata associated with the meeting;
    capture during a meeting, one or more meeting snippets based on identification of the trigger event;
    receive feedback on each of the meeting snippets from a plurality of participants during the meeting;
    dynamically generate a news feed based on the captured one or more meeting snippets and the feedback; and display the dynamically generated news feed to the plurality of participants.

12. The central server of claim 11, wherein the hardware processor is further configured to receive an input from a participant, wherein the input is indicative of marking at least one meeting snippet from the one or more meeting snippets as private, and wherein meeting snippets marked as private are removed from the news feed.

13. The central server of claim 11, wherein the hardware processor is further configured to rank each of the one or more meeting snippets based on the feedback, wherein the feedback is captured using one or more interactions from the plurality of participants, wherein the one or more interactions comprise at least one of: a number of likes, a number of comments, a number of times the meeting snippets are shared on one or more social network platforms or enterprise platforms.

14. The central server of claim 11, wherein the hardware processor is further configured to render the news feed in a chronological manner to the plurality of participants.

15. The central server of claim 11, wherein the hardware processor is further configured to render the one or more meeting snippets with ranking higher than a pre-defined threshold at top of chronological representation of the news feed.

16. The central server of claim 11, wherein the hardware processor is further configured to categorize the news feed into one or more categories based on meeting transcript generated from meeting data, wherein the metadata associated with the meeting comprises at least one of: the meeting data and an agenda of the meeting, and wherein the meeting data comprises audio content, video content, meeting notes, presentation content, screen sharing content, or file sharing content.

17. The central server of claim 11, wherein the hardware processor is further configured to
    determine a timestamp associated with the trigger event; and
    capture a meeting snippet of the one or more meeting snippets to include content of a first predetermined duration chronologically prior to the timestamp and content of a second predetermined duration chronologically after the timestamp.

18. The central server of claim 11, wherein the hardware processor is further configured to:
    receive a selection of one or more categories from at least one participant from the plurality of participants; and
    provide a news feed associated with each of the selected one or more categories to the at least one participant from the plurality of participants.

19. The central server of claim 18, wherein the hardware processor is further configured to identify one or more relevant categories of the news feed associated with the plurality of participants, wherein the one or more relevant categories are derived by using machine learning techniques on participant preferences associated with each of the plurality of participants.

20. A non-transitory computer readable medium having stored thereon, computer executable instructions, which when executed by at least one hardware processor in an electronic device, causes the electronic device to perform operations, the operations comprising:
    identifying in real time, a trigger event initiated by at least one participant of a meeting, wherein the trigger event is indicative of at least a reference, by the participant, to metadata associated with the meeting;
    capturing, during a meeting, one or more meeting snippets based on identification of the trigger event;
    receiving feedback on each of the meeting snippets from a plurality of participants during the meeting;
    dynamically generating a news feed based on the captured one or more meeting snippets and the feedback; and
    displaying the dynamically generated news feed to the plurality of participants.

21. A method for generating a news feed, the method comprising:
    identifying, by a processor in real time, a trigger event initiated by at least one participant of a meeting, wherein the trigger event is indicative of at least a reference, by the participant, to metadata associated with the meeting;
    capturing, during a meeting by the processor, one or more meeting snippets based on identification of the trigger event;
    receiving, by the processor, feedback on each of the meeting snippets from a plurality of participants during the meeting;
    dynamically generating, by the processor, a news feed based on the captured meeting snippets and the feedback;
    displaying, by the processor, the dynamically generated news feed to the plurality of participants; and
    receiving, by the processor, an input from a participant, wherein the input is indicative of marking at least one meeting snippet from the one or more meeting snippets as private, and wherein the at least one meeting snippet marked as private are removed from the news feed.

22. A method for generating a news feed, the method comprising:
    identifying, by a processor in real time, a trigger event initiated by at least one participant of a meeting, wherein the trigger event is indicative of at least a reference, by the participant, to metadata associated with the meeting;
    capturing, during a meeting by the processor, one or more meeting snippets based on identification of the trigger event;
    receiving, by the processor, feedback on each of the meeting snippets from a plurality of participants during the meeting;
    dynamically generating, by the processor, a news feed based on the captured meeting snippets and the feedback;
    displaying, by the processor, the dynamically generated news feed to the plurality of participants; and
    rendering, by the processor, the news feed in a chronological manner to the plurality of participants.

23. A method for generating a news feed, the method comprising:
    identifying, by a processor in real time, a trigger event initiated by at least one participant of a meeting, wherein the trigger event is indicative of at least a reference, by the participant, to metadata associated with the meeting;
    capturing, during a meeting by the processor, one or more meeting snippets based on identification of the trigger event;
    receiving, by the processor, feedback on each of the meeting snippets from a plurality of participants during the meeting;
    dynamically generating, by the processor, a news feed based on the captured meeting snippets and the feedback; and displaying, by the processor, the dynamically generated news feed to the plurality of participants, wherein dynamically generating, by the processor, of the news feed comprises ranking each of the one or more meeting snippets based on the feedback, wherein the feedback is captured using one or more interactions from the plurality of participants, wherein the one or more interactions comprise at least one of: a number of likes, a number of comments, a number of times the meeting snippets are shared on one or more social network platforms or enterprise platforms.

24. A method for generating a news feed, the method comprising:

identifying, by a processor in real time, a trigger event initiated by at least one participant of a meeting, wherein the trigger event is indicative of at least a reference, by the participant, to metadata associated with the meeting;

capturing, during a meeting by the processor, one or more meeting snippets based on identification of the trigger event;

receiving, by the processor, feedback on each of the meeting snippets from a plurality of participants during the meeting;

dynamically generating, by the processor, a news feed based on the captured meeting snippets and the feedback;

displaying, by the processor, the dynamically generated news feed to the plurality of participants; and rendering, by the processor, the one or more meeting snippets with ranking higher than a pre-defined threshold at top of chronological representation of the news feed.

25. A method for generating a news feed, the method comprising:

identifying, by a processor in real time, a trigger event initiated by at least one participant of a meeting, wherein the trigger event is indicative of at least a reference, by the participant, to metadata associated with the meeting;

capturing, during a meeting by the processor, one or more meeting snippets based on identification of the trigger event;

receiving, by the processor, feedback on each of the meeting snippets from a plurality of participants during the meeting;

dynamically generating, by the processor, a news feed based on the captured meeting snippets and the feedback;

displaying, by the processor, the dynamically generated news feed to the plurality of participants, wherein capturing the one or more meeting snippets comprises:

determining, by the processor, a timestamp associated with the trigger event; and capturing, by the processor, a meeting snippet of the one or more meeting snippets to include content of a first predetermined duration chronologically prior to the timestamp and content of a second predetermined duration chronologically after the timestamp.

* * * * *